United States Patent
Acker et al.

(10) Patent No.: US 7,223,936 B2
(45) Date of Patent: May 29, 2007

(54) ARRANGEMENT FOR SEVERING A FLAT WORKPIECE OF BRITTLE MATERIAL MULTIPLE TIMES BY MEANS OF A LASER

(75) Inventors: Stefan Acker, Waldeck (DE); Ronny Ullmann, Altenberga (DE); Juergen Weisser, Jena (DE)

(73) Assignee: JENOPTIK Automatisierungstechnik GmbH, Jena (DE)

(*) Notice: Subject to any disclaimer, the term of this patent is extended or adjusted under 35 U.S.C. 154(b) by 0 days.

(21) Appl. No.: 11/423,765

(22) Filed: Jun. 13, 2006

(65) Prior Publication Data

US 2006/0278619 A1    Dec. 14, 2006

(30) Foreign Application Priority Data

Jun. 13, 2005    (DE)    ............ 10 2005 027 800

(51) Int. Cl.
*B23K 26/38* (2006.01)
(52) U.S. Cl. .................................. 219/121.67
(58) Field of Classification Search ........... 219/121.67, 219/121.68, 121.69, 121.72, 121.84; 225/93.5, 225/94
See application file for complete search history.

(56) References Cited

U.S. PATENT DOCUMENTS

| | | | | |
|---|---|---|---|---|
| 6,407,360 B1 * | 6/2002 | Choo et al. | ............ | 219/121.67 |
| 6,660,963 B2 * | 12/2003 | Hoekstra et al. | ........ | 219/121.72 |
| 2003/0052098 A1 * | 3/2003 | Kim et al. | .................. | 225/93.5 |
| 2003/0146197 A1 * | 8/2003 | Jeon | ...................... | 219/121.72 |
| 2003/0201261 A1 * | 10/2003 | Kang et al. | ............ | 219/121.72 |
| 2003/0209528 A1 | 11/2003 | Choo et al. | | |

FOREIGN PATENT DOCUMENTS

| | | | |
|---|---|---|---|
| DE | 38 01 068 | | 7/1989 |
| DE | 100 01 292 | | 11/2001 |
| JP | 2000-233936 A | * | 8/2000 |
| WO | 96/20062 | | 7/1996 |
| WO | WO-00/02700 A1 | * | 1/2000 |

* cited by examiner

*Primary Examiner*—Geoffrey S. Evans
(74) *Attorney, Agent, or Firm*—Reed Smith LLP

(57) ABSTRACT

Flat workpieces of brittle material be severed in a time-saving manner by an arrangement according to the invention by inducing thermomechanical stresses by laser radiation, particularly along severing lines in the same orientation in alternating directions, in that the arrangement has two coolant nozzles which selectively direct coolant to the workpiece and which, preferably coupled with optical means for shaping the laser beams, are mounted so as to be rotatable around the axis of the laser head.

8 Claims, 1 Drawing Sheet

ARRANGEMENT FOR SEVERING A FLAT WORKPIECE OF BRITTLE MATERIAL MULTIPLE TIMES BY MEANS OF A LASER

CROSS-REFERENCE TO RELATED APPLICATION

This application claims priority of German Application No. 10 2005 027 800.0, filed Jun. 13, 2005, the complete disclosure of which is hereby incorporated by reference.

BACKGROUND OF THE INVENTION a) Field of the Invention

The invention is directed to an arrangement for severing brittle materials by means of a laser by inducing thermomechanical stresses as is known generically from WO96/20062.

b) Description of the Related Art

Laser methods in which the material is split by inducing thermal stresses rather than removing material rely on the principle of limited local heating below the softening temperature of the material so that compressive stresses occur in the material and subsequent sudden cooling by a directed coolant jet so that tensile stresses are generated. The forces occurring in the material lead to a cleavage break.

Apart from a laser method of the type mentioned above, WO96/20062 also discloses an arrangement for implementing such a method. The arrangement comprises an irradiation portion having a laser and a focusing system which is arranged along the optical axis of the laser, a mechanism which is displaceable relative to the irradiation portion and by which a coolant is brought into the cutting zone, meant for fixating the material to be cut, means for the displacement of the laser and the coolant relative to the workpiece, and a control device.

Many other publications are directed to methods by which the beam density distribution is the beam spot or the beam spot shape are optimized in order to improve the quality and speed of the severing process. In a corresponding manner, the arrangement used for implementing the method are distinguished substantially only by different beam-shaping elements and beam-guiding elements. Such arrangements basically have the following features in common.

- A laser radiation source, basically with controllable radiation output and radiation duration. Depending on the laser, the emitting beam bundle can have, in particular, different beam cross-sectional shapes and different beam density distribution in addition to a different wavelength and radiation output.
- A laser head in which optical means are provided for focusing the laser beam bundle in direction of the workpiece surface. In certain cases, these optical means can also be used for beam shaping and beam guidance or to change a beam density distribution.
- Means for the relative movement of the laser head and workpiece along a severing line.
- A coolant device with a coolant nozzle that is arranged behind the laser nozzle in the movement direction at an adjustable or fixed distance.
- A control device by which, among other things, the laser head and the coolant nozzle connected to the latter are positioned in direction of the severing line.

It is a priority in the designing of arrangements of this kind that these arrangements must operate precisely and at a high process speed in permanent operation and under industrial conditions.

Downtimes must be kept as short as possible in order to increase the efficiency of the method at given process speed, i.e., at a given time period for carrying out a severing cut. Downtimes are nonoperating periods for maintenance, setup, and positioning of the tool and workpiece in a starting position.

If only one severing cut is to be carried out on a workpiece, the downtime required for exchanging the severed workpiece for a new workpiece can also be used to bring the tool into the starting position.

Downtimes a particularly long when a plurality of starting positions must be set up in order to cut a workpiece into a plurality of individual parts, e.g., when covering a wafer disk into a plurality of chips. In this connection, the wafer disk is cut in x-direction into a plurality of individual strips of equal width which are subsequently cut in y-direction into a plurality of chips of equal length.

After every severing cut, the tool, i.e., the laser head with the coolant nozzle, and the workpiece must together be brought into a new starting position. For this purpose, either the laser head which is fixedly connected to the coolant nozzle over the stationary workpiece can be brought back to the starting edge of the preceding severing cut and offset by the strip width (forward feed movement) and the wafer disk is positioned under the stationary laser head in a corresponding manner, or the severing cut is started at the ending edge of the preceding cut, which then only requires relative offsetting by the strip width but necessitates a repositioning of the cooling nozzle relative to the laser head so that the cooling nozzle is arranged behind the laser head in the cutting direction.

When the severing cuts are carried out proceeding from the same starting edge, the downtime is high, substantially comprising the time required for positioning the laser head at the beginning of a severing cut.

When the severing cuts are carried out from alternate sides, a high downtime results substantially from the time required to reposition the coolant nozzle relation to the laser head so that it is arranged behind the laser head in each instance.

OBJECT AND SUMMARY OF THE INVENTION

It is the primary object of the invention to provide an arrangement which is particularly suitable for generating identically oriented severing cuts on a workpiece in alternating directions with the shortest possible downtime.

The object is met in an arrangement in accordance with the invention for severing a flat workpiece of brittle material multiple times along severing lines oriented in the same direction by indicating thermomechanical stresses by a laser. The arrangement comprises a laser head by which a laser beam is directed to a workpiece, means for the orientation, positioning, and relative movement between the laser head and the workpiece along a severing line, means for applying a coolant jet to the workpiece along the severing line and a control device for controlling the course of the process. The means for applying the coolant jet further comprising two coolant nozzle whose axes determine the direction of the coolant jet. These axes together with the axis of the laser head determining the beam direction of the laser beam end lie in a plane (work plane) extending through the severing line. The axes of the coolant nozzles are arranged at an offset by 180° relative to one another at the same distance from and at the same inclination to the axis of the laser head. The control device is designed in such a way that a coolant jet can be directed to the workpiece selectively by one coolant nozzle to the other coolant nozzle in order to carry out cuts in different directions.

An embodiment example of the invention will be described in more detail in the following with reference to a drawing.

DESCRIPTION OF THE PREFERRED EMBODIMENT

Figure 1:
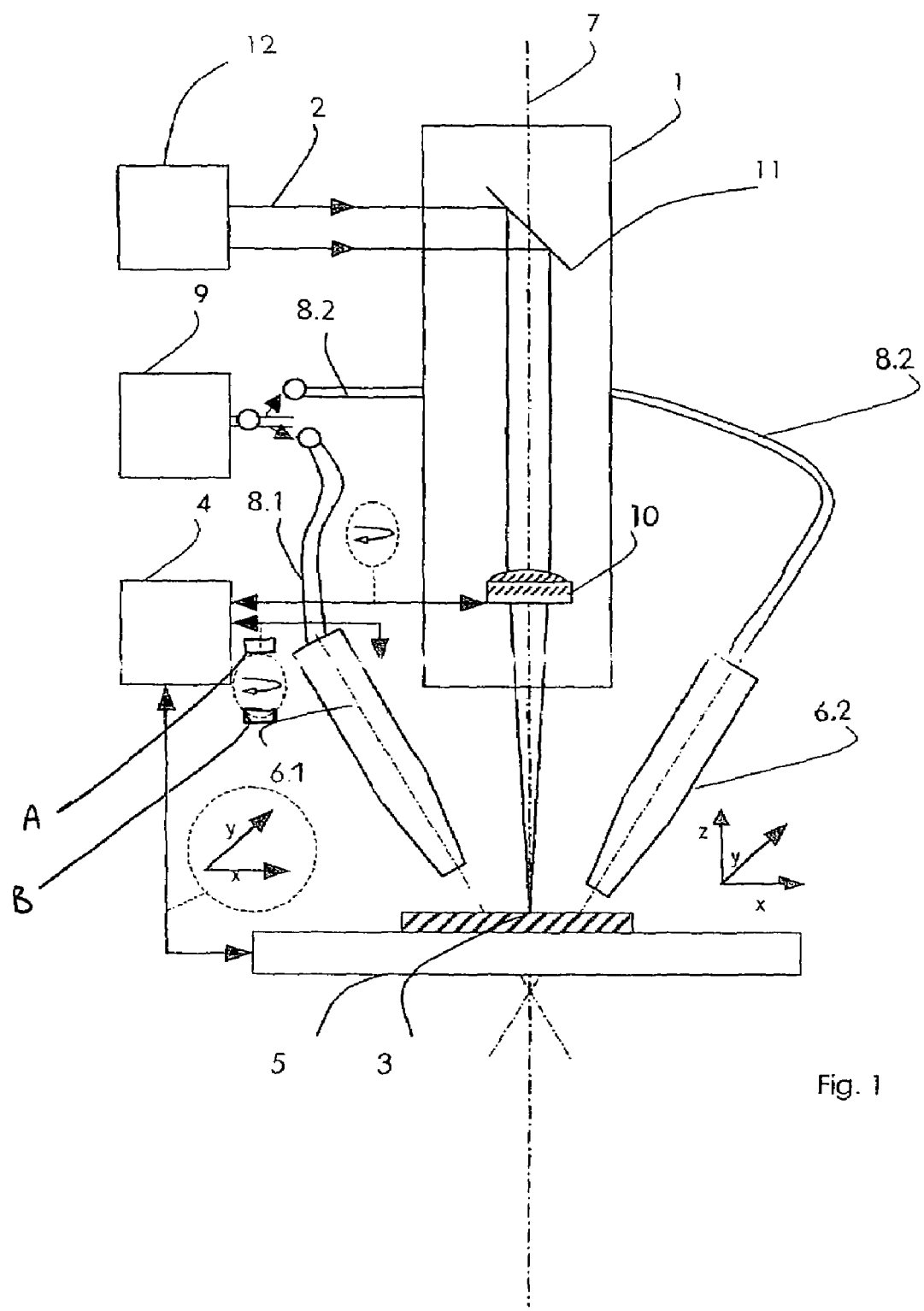
FIG. 1 shows a schematic diagram of arrangement according to the invention.

Similar to generic arrangements, the arrangement according to the invention substantially comprise a laser head 1 by which a laser beam 2 is directed to a workpiece 3, means for applying a coolant jet to the workpiece, means for moving the laser head relative to the workpiece, and a control device 4 for controling the course of the process.

In contrast to the generic arrangements known from the prior art, the construction and arrangement of the means for arranging the coolant jet relative to the laser head 1 and the construction of the means for generating the relative movement between the laser head 1 and workpiece 3 are particularly substantial to the invention.

Different steps are carried out in the arrangement to keep the downtime between the conclusion of a severing cut and the start of the subsequent severing cut as short as possible.

The means for generating the relative movement are constructed in such a way that the transitional component of the movement is realized by means of the linear displacement of the workpiece, e.g., by means of an x-y table 5 which is fixed with respect to rotation, which is shown schematically in FIG. 1 at the control line between the control device 4 and the x-y table 5, and the rotational component, if any, of the movement is realized by means of a rotation of the coolant nozzles 6.1 and 6.2 around the stationary laser head 1. This rotational movement is necessary when the orientation of the severing cut is changed. A onetime change in direction is carried out by rotating by 90°, e.g., when, after severing the workpiece into individual strips by severing cuts in x-direction, these strips are to be divided into individual chips by severing cuts in y-direction. In order to carry out freeform cuts, the coolant nozzle can be rotated continuously while generating the severing cut. In order to obviate the need for a rotational movement which is required so that the coolant strikes the workpiece 3 behind the laser beam 2 in each instance when carrying out the process when changing only the direction of the severing movement, two coolant nozzles 6.1 and 6.2 are associated with the laser head 1 and are arranged at an equal, adjustable distance from and at an identical inclination to the laser head 1 to be offset by 180° relative to one another at the laser head 1.

This results in an extensive saving of time particularly when a plurality of severing cuts are to be carried out at a workpiece 3 with one orientation in alternating directions in a highly efficient manner with respect to time.

The laser head 1, together with the two coolant nozzles 6.1, 6.2, is designated in the following description as a tool head. The axes of the two coolant nozzles 6.1, 6.2 and the axis 7 that coincides with the axis of the existing laser beam 2 lie in a plane (work plane of the tool head). In the schematic diagram shown in FIG. 1, the work plane lies in the drawing plane. This view applies in corresponding manner to a cutting orientation along the x-axis. Coolant supply 8.1 or 8.2 is connected to the coolant source 9 depending on whether the direction is towards or away from the origin of the coordinate system in the diagram.

In order to orientate the work plane relative to the respective subsequent severing cut to be carried out in the workpiece, i.e., the work plane extends through the line of the severing cut, the tool head of arrangement according to the invention can be designed in different ways.

In a first advantageous construction, as was already mentioned, the coolant nozzles 6.1, 6.2, are rotatable around the laser head 1. For this purpose, a holder which is rotatable around the axis 7 of the laser head and at which the two coolant nozzles 6.1, 6.2, are fastened is arranged at the laser head 1. By rotating the holder, which is shown schematically in FIG. 1 at the control line between the control device 4 and coolant nozzle 6.1, the work plane is accordingly rotated around the axis 7 of the laser head 1. Catch elements A and B are provided at the holder so that the work place can be swiveled back and forth between defined positions. A rotation of the work plane is necessary when a subsequent severing cut runs in a different severing direction. This is the case, for example, when the strips generated by completely severing a disk are to be cut into individual chips, which is generally carried out by severing cuts extending at an offset 90°. Due to the possibility of a continuous rotation, the work plane can also be oriented in any desired severing direction during severing.

However, as a rule, the severing cuts extend only in two orientations, e.g., the x-direction and the y-direction, so that it is necessary to swivel the coolant nozzles 6.1, 6.2 relative to the laser head 1 between only two relative positions. For this purpose, it is advantageous to provide catch connections so that the coolant nozzles 6.1, 6.2 can be oriented rapidly and with high accuracy in only two positions relative to the laser head 1.

In order to carry out severing cuts in the same orientation but in alternating directions, the coolant nozzles 6.1, 6.2 are activated alternately so that the coolant nozzle 6.1 or 6.2 which trails with respective to direction directs a coolant jet to the severing line. The process parameters for cooling are appropriately identical by selecting identical coolant nozzles with identical fluidic characteristics and with an identical arrangement with respect to the laser head 1. The leading coolant nozzle 6.1 or 6.2 can also serve to spray a marking agent or to blow off impurities from the severing line.

However, when the tool head is oriented with respect to the workpiece 3 exclusively by rotating the work plane around the axis 7 of the laser head 1, it may happen that other process parameters are not identical for severing cuts in a different severing direction. This is the case whenever the beam spot geometry or the beam density distribution in the beam spot is not rotationally symmetric to the axis 7. This means that it is not sufficient in this case to orient the work plane as determined by the axes of the coolant nozzles 6.1, 6.2 and of the laser head 1 relative to the severing cut; rather, the relative position of the beam spot must also be oriented with respect to the direction of the severing cut. This is made possible in that the optical means 10 for shaping the laser beam 2 are also constructed so as to be rotatable around the axis 7. This is shown schematically in FIG. 1 at the control line between the control device 4 and the optical means 10.

In the introductory part relating to prior art, it was mentioned that the methods known from the prior art for severing brittle material by inducing thermomechanical stresses by means of a laser often differ with respect to beam spot geometrics and beam density distribution in the beam spot, so that an optimized cut quality and process speed must be achieved for different materials and material thickness.

The choice and arrangement of the optical means 10 which are provided in the laser head 1 and which also serve to focus the laser beam 2 are decisive for the beam spot geometry end the beam density distribution. For example, the beam spot geometry can be influenced by a cylindrical lens, an Axicon, or a diffractive element, and their rotational position relative to the severing line is decisive for the position of the beam spot relative to the orientation of the severing line.

Accordingly, in order to achieve identical beam spot parameters for different severing line orientations, the optical means 10 and the coolant nozzles 6.1, 6.2 must be rotated by identical angles around the axis 7.

Therefore, it is advantageous when the optical means 10 coupled with the coolant nozzles 6.1, 6.2 in the laser head 1 are mounted so as to be rotatable. The laser beam 3 can be optimized for workpieces 3 of different thickness and different material parameters by controlled axial displacement of the optical means 10.

In a second embodiment example not shown in the drawing, the laser head 1 is mounted so as to be rotatable by 180° around its axis 7 instead of fastening the coolant nozzle 6.1, 6.2 so as to be rotatable around the laser head 1 and the optical means 10 in the laser head 1 so as to be rotatable around its axis 7. The coolant nozzles 6.1, 6.2 and the optical means 10 are fixedly connected to the laser head 1. The disadvantage in this case is that arrangements which are provided for coupling in the laser beam, shown in FIG. 1 as a mirror 11, also rotate relative to the laser 12 emitting the laser beam 2, so that additional steps must be taken for coupling in the laser beam.

The person skilled in the field of the invention will appreciate that the invention is not limited to the details of the embodiment forms described by way of example in the preceding description and that the present invention can be embodied in other specific forms without departing from the scope of the invention as set forth in the appended claims.

REFERENCE NUMBERS 1 laser head
2 laser beam
3 workpiece
4 control device
5 x-y table
6.1, 6.2 coolant nozzles
7 axis
8.1, 8.2 coolant supply
9 coolant source
10 optical means
11 mirror
12 laser

What is claimed is:

1. An arrangement for severing a flat workpiece of brittle material multiple times along severing lines oriented in the same direction by inducing thermomechanical stresses by a laser, comprising:

a laser head by which a laser beam is directed to a workpiece;

means for the orientation, positioning, and relative movement between the laser head and the workpiece along a severing line;

means for applying a coolant jet to the workpiece along the severing line; and a control device for controlling the course of the process;

said means for applying the coolant jet further comprising two coolant nozzles whose axes determine the direction of the coolant jet, which axes together with the axis of the laser head determining the beam direction of the laser beam and lie in a plane (work plane) extending through the severing line;

said axes of the coolant nozzles being arranged at an offset by 180° relative to one another at the same distance from and at the same inclination to the axis of the laser head; and said control device being designed in such a way that a coolant jet can be directed to the workpiece selectively by one coolant nozzle or the other coolant nozzle in order to carry out cuts in different directions.

2. The arrangement according to claim 1, wherein the means for orientation, positioning, and relative movement between the laser head and the workpiece comprise an x-y table which is driven in x-y direction and on which the workpiece is fixed for carrying out the transitional component of the relative movement, and means for the rotation of the work plane for carrying out a rotational component of the relative movement in order to carry out cutting in different directions.

3. The arrangement according to claim 1, wherein the means for rotating the work plane comprise a holder which is rotatable around the laser head and the axis thereof and to which the coolant nozzles are fastened.

4. The arrangement according to claim 3, wherein optical means for beam shaping which are provided in the laser head are mounted in combination with the coolant nozzles so as to be rotatable around the axis.

5. The arrangement according to claim 3, wherein catch elements are provided at the holder so that the work plane can be swiveled back and for between defined positions.

6. The arrangement according to claim 1, wherein the means for rotating the work plane of the laser head are mounted so as to be rotatable around the axis of the laser head.

7. The arrangement according to claim 1, wherein the coolant nozzles which do not direct a coolant jet to the workpiece direct a jet of a marking agent to the workpiece.

8. The arrangement according to claim 1, wherein the coolant nozzles which do not direct a coolant jet to the workpiece direct a gas jet to the workpiece in order to blow off impurities in the area of the severing line.

* * * * *